Oct. 30, 1962
A. CHAUSSON
3,060,991
MACHINE FOR JOINING STRIPS OF GREAT LENGTH AND
MORE PARTICULARLY FOR MANUFACTURING RADIATOR
FINS AND SIMILAR APPLICATIONS
Filed Dec. 7, 1959
2 Sheets-Sheet 1
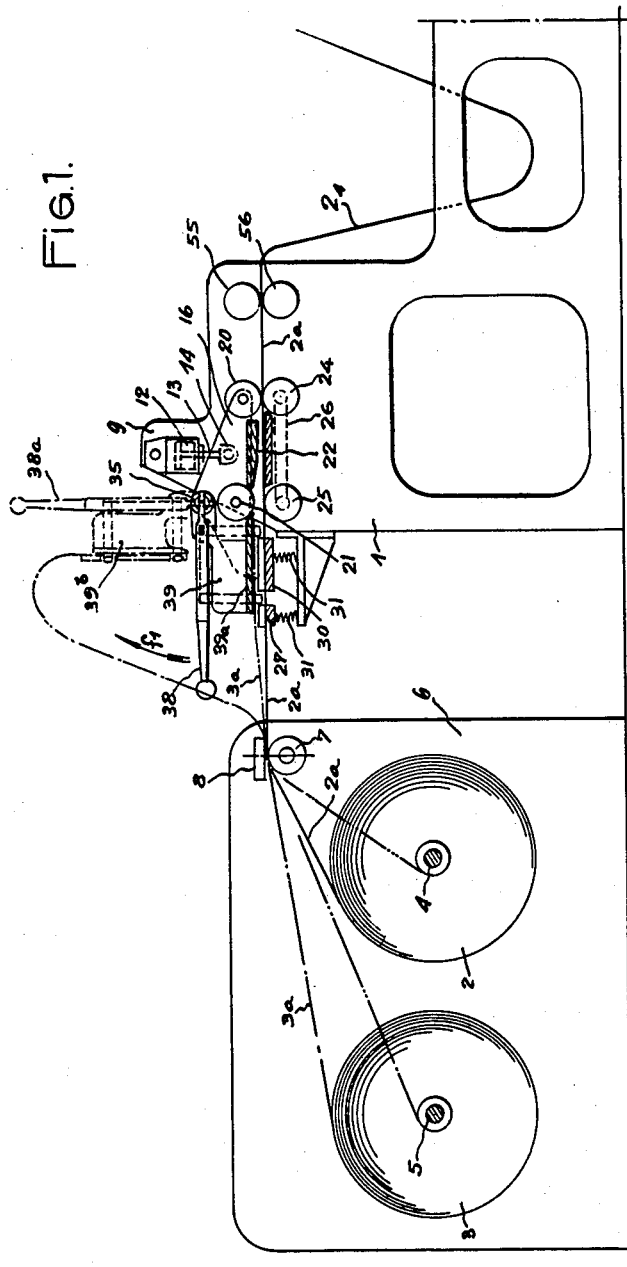
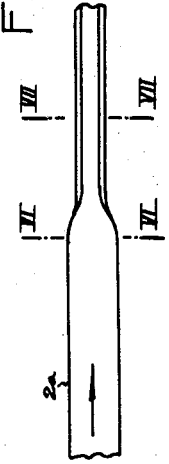
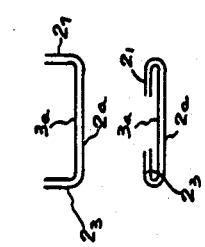
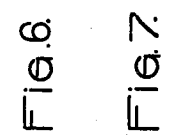
Inventor
André Chausson
By Alvin Browdy
Attorney

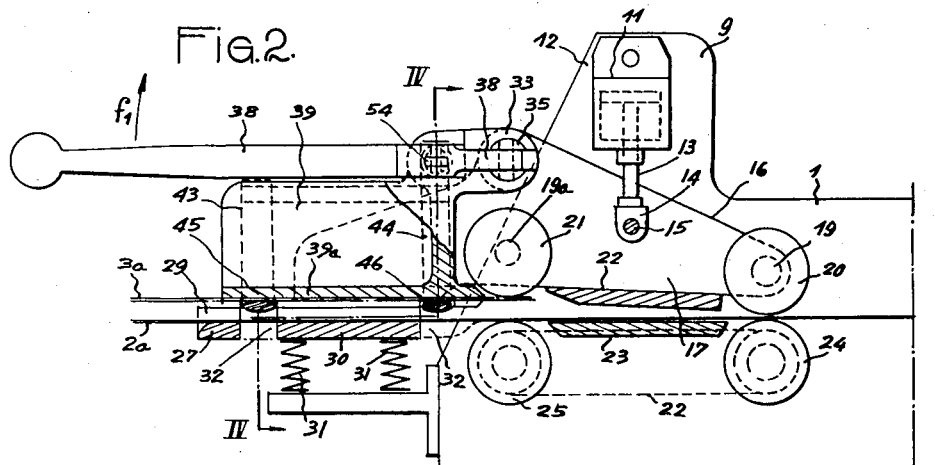
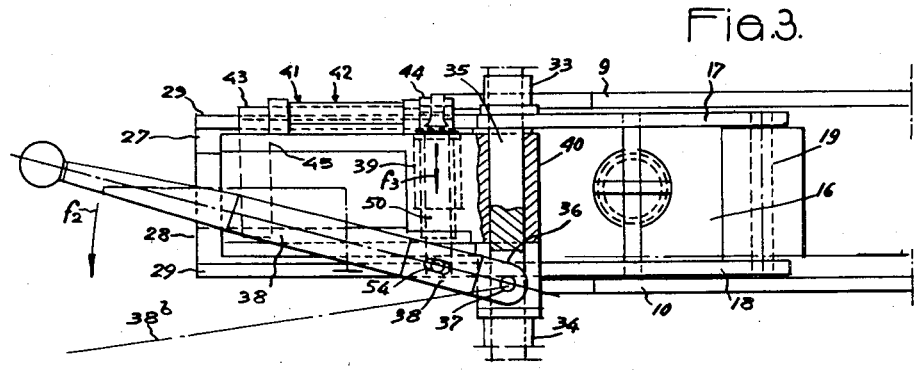
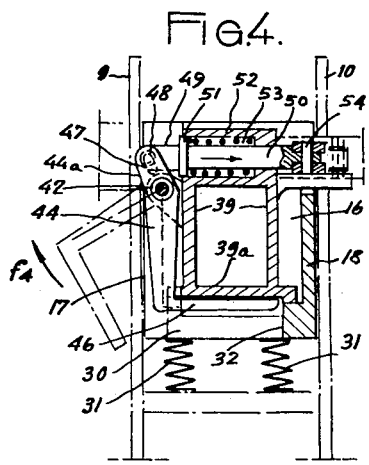

United States Patent Office 3,060,991
Patented Oct. 30, 1962

3,060,991
MACHINE FOR JOINING STRIPS OF GREAT LENGTH AND MORE PARTICULARLY FOR MANUFACTURING RADIATOR FINS AND SIMILAR APPLICATIONS
André Chausson, Asnieres, France, assignor to Societe Anonyme des Usines Chausson, Asnieres, France, a company of France
Filed Dec. 7, 1959, Ser. No. 857,780
Claims priority, application France Dec. 11, 1958
3 Claims. (Cl. 153—1)

In certain industries, and more particularly, in those dealing with the manufacture of cooling radiators, certain machines shape, by stamping, punching or other methods, parts from thin metal strips which are then cut up.

In the particular case of manufacturing cooling radiator fins, the speed at which the machines operate for shaping fins is very great and these machines comprise auxiliary members, such as shears and conveyor devices for the strips which are relatively complex.

These machines are fed from reels or coils formed by thin metal, strips, of relatively narrow width, these strips being engaged in the various wheels that the machine comprises which requires a relatively considerable time for positioning.

Owing to the relatively reduced length of the coils or reels that it is possible to employ, it is necessary to stop the machines every time a coil is changed, which entails a considerable loss of time.

The present invention seeks to obviate this disadvantage by creating a new machine enabling the strips to be joined as the new reels or coils come into use, so that the shaping machines can operate in a continuous manner.

According to the invention, the machine comprises shaping members for folding and flattening the lateral edges of a strip continuously unwound from a reel, these shaping members being placed immediately behind a mobile cradle comprising rollers of which some, at least, cooperate for driving the strip with the driving rollers of a frame, this cradle also maintaining, by an articulation, a device for hooking and bringing forward the end of the strip of a second reel, this second strip being made to superimpose the first reel strip, when the cradle is lowered by a driving member whose working is controlled by the end of the first strip, so that the drive of these two strips takes place simultaneously in order that the shaping members fold together the edges of the two strips which are thus clipped together.

Various other characteristics of the invention will moreover be revealed by the detailed description which follows.

One form of embodiment of the purpose of the invention is shown, by way of non-restrictive example, in the attached drawings.

FIGURE 1 is a diagrammatical elevation, partly in section, of the machine according to the invention.

FIGURE 2 is an elevation, partly in section, on a larger scale, of a detail of FIGURE 1.

FIGURE 3 is a partially cut-away plane view corresponding to FIGURE 2.

FIGURE 4 is a section taken substantially along the line IV—IV of FIGURE 2.

FIGURE 5 is a diagrammatical plane view of a portion of strip showing one of the operations carried out by the machine.

FIGURE 6 is a section, on a larger scale, taken substantially along the line VI—VI of FIGURE 5.

FIGURE 7 is a section similar to FIGURE 6, but taken substantially along the line VII—VII.

The machine described in detail hereafter is chiefly intended to be placed immediately in front of members (not shown) for feeding presses for shaping radiator fins.

This machine comprises a frame 1 which can be directly formed by the press frame or connected to the latter.

As already explained above, this machine is intended, at one and the same time, to edge the strips used for shaping fins and ensure the connecting of successive strips.

The strips for shaping fins are coiled to form coils 2, 3 (FIG. 1), of which two only are shown in the drawings, these coils being intended to be mounted loosely on spindles 4, 5 carried by a frame 6.

This strip wound off, from reel 2, for example, i.e., the one designated by the reference 2a, is firstly engaged between a roller 7 and a presser 8 connected to an electric contact unit, so that this presser makes a signal when the reel 2 is finished and the end of the strip 2a leaves the roller 7.

The frame 1 forms cheeks 9, 10 on its top between which the body 11 of a double-acting jack 12 is fitted whose piston rod 13 is connected by a cap 14 (FIG. 2) to a spindle 15 which connects it to a cradle, designated as a whole by the reference 16, which comprises two lateral parts 17, 18. By spindles 19, 19a, this cradle carries presser rollers 20, 21, between which a guide plate 22 (FIG. 2) is placed carried by the parts 17, 18.

The cradle 16, which is carried by the jack rod 13, is placed over a shelf 23 corresponding to the guide plate 22 and on either side of which are rollers 24, 25, one of which is connected to a driving shaft. These rollers are also connected to each other by a chain 26, so that they revolve simultaneously.

The frame 1 also carries slides 27 and 28 (FIGURES 2 and 3) each of which have a rising edge 29.

The distance separating the rising edges 29 corresponds to the width of the strips 2a, 3a, which are conveyed, as explained hereafter, on to these slides 27, 28.

30 designates a mobile shelf carried by springs 31, this shelf being placed in a cavity 32 (FIGURES 2 and 4) left free by the slides 27, 28 before the roller 25.

At their top part, the parts 17, 18 carry bearings 33, 34 for the articulation of a spindle 35 which, close to the bearing 34, has a cavity 36 (FIGURE 3) traversed by a perpendicular spindle 37 on which one of the ends of a lever 38 is hinged.

The spindle 35 also acts to maintain a pivoting frame 39 with a bore 40 for engaging said spindle 35.

The pivoting frame 39 is of appreciably parallelepipedic shape and can be inserted between the parts 17, 18. This frame laterally supports a casing 41 in which a shaft 42 (FIGURES 3 and 4) is engaged. This shaft acts for holding and driving lugs 43 and 44 of appreciably square shape whose respective arms 45 and 46 (FIGURES 2 and 4) have their edges rounded and are so shaped as to intercept at least the greater part of the underneath 39a of the pivoting frame 39.

The lug 44 (FIGURE 4) has a projection 44a in which a slot 47 is made for engaging a spindle 48 connecting the arms of a cap 49 formed at the end of a slide 50. This slide comprises a shoulder 51 against which a spring 52 presses, housed, as well as this slide, in a cavity 53 in the pivoting frame 39.

The free end of the slide 50 projects beyond the pivoting frame 39 and is connected by a spindle 54, to the lever 38 described above.

The machine described above also comprises, as shown in FIGURE 1, cooperating rollers 55, 56, called edging rollers, which are intended to flatten the edges $2_1$, $2_3$ (FIGURES 6, 7) of the strip 2a, said edges being progressively folded over by members (not shown) placed between the rollers 20, 24, on the one hand, and 55, 56 on the other.

FIGURE 5 also shows how the strip 2a or the strip 3a is progressively folded so that its two sides are bordered as shown in section in FIGURE 7, in order to make them rigid.

The machine described above works in the following manner:

The strip 2a for example, engaged between the roller 7 and the presser 8, is made to pass on the slides 27, 28 by sliding on the top of the resilient shelf 30, then passing on to the roller 25, the shelf 23 and the roller 24 against which it is held by the roller 20. Behind this latter roller, the strip 2a has its edges folded, then flattened by the rollers 55, 56, this strip then forming a loop 2₄ of variable length controlled by a detective mechanism (not shown) intended to interrupt the movement of the fin stamping press when the arrow that it makes becomes too small.

During the normal unwinding of the reel 2, the reel 3 is placed in a waiting position. In this position, the strip 3a is positioned for passing between the strip 2a and the presser 8, then the end of this strip is placed against the underneath 39a of the pivoting frame 39, a position in which it is held by the arms 45, 45a of the squares 43, 44.

To place the strip 3a in this latter position, it is only necessary to pivot the lever 38 in the direction of the arrow $f_1$ to bring it into the position 38a shown by the dot-and-dash lines in FIGURE 1.

In this latter position, the mobile frame 39, designated by the reference 39b is placed over the cradle 16, because this frame pivots around the spindle 35. The lever 38 at this moment is moved in the direction of the arrow $f_2$ to reach the position 38b (FIG. 3). This latter movement, which takes place around the spindle 37, has the effect of displacing the slide 50 in the direction of the arrow $f_3$ and consequently, the shaft 42 pivots in the direction of the arrow $f_4$ (FIGURE 4), so that the squares 43, 44 are brought to the position shown by the dot-and-dash lines in FIGURE 4, thus disengaging the underneath 39a of the pivoting frame 39.

The end of the strip 3a is then applied to this underneath 39a, then the lever 38 is pivoted in the opposite direction to that of the arrow $f_2$ to bring the squares 43, 44 to their initial position. In this manner, the strip 3a is placed as shown by the dot-and-dash lines in FIGURE 1. Then, by again pivoting the lever 38a, but in the opposite direction to that of the arrow $f_1$ (FIGURE 1), the frame 39 is brought into the position shown by the solid lines in FIGURE 2, for which the end of the strip 3a is placed above the strip 2a without being in contact with the latter.

When the coil 2 is finished, the end of the strip 2a escapes from the roller 7, so that the presser 8 drops slightly. This movement has the effect of operating the closing of a control circuit of the jack supply 12. The jack supply at this moment takes place so that its piston rod 13 comes down, which has the effect of bringing the presser roller 21 against the underneath of which the strip 3a presses in a position for which the latter comes into contact with the remaining part of the strip 2a. Simultaneously, the arms 45, 46 of the squares 43, 44 enter the cavity 32 left free by the slides 27, 28, this has the effect of slightly distorting the remaining part of the strip 2a by causing the shelf 30 to descend which compresses the springs 31. This means that the advance of the remaining part of the strip 2a is braked to an extent that is at least equivalent to the braking action that the arms 45, 46 exert on the strip 3a. It follows that there can be no slipping of the strip 3a in relation to the remaining part of the strip 2a and that consequently the two strips are simultaneously driven.

When the two strips pass on the members for raising the edges, they are simultaneously distorted, as shown in FIGURES 6 and 7, which results in the clipping of the two strips which are superimposed on each other, this clipping being sufficient to prevent the strips from becoming separated during the subsequent operations to which they are subjected.

The thickness of the strips being very slight, the characteristics of those of the fins which are stamped and which comprise the two juxtapositioned strips are not appreciably modified.

When the remaining part 2a has completely left the slides 27, 28, it is only necessary, by proceeding as already explained, to disengage the squares 43, 44 again, then to bring a new strip into the waiting position.

I claim:

1. In a strip feeding apparatus comprising a supporting frame carrying a plurality of supply rolls and driving wheels to successively unwind said rolls to supply strip to a receiving machine the particular structure of providing between said supply rolls and driving wheels a set of driving rollers for said strip to be unwound, a vertically movable cradle, presser roller carried by said cradle to cooperate with said driving rollers, an actuating mechanism associated to said cradle for actuation thereof, a transverse shaft carried by said cradle, a pivoting frame journaled to said shaft carrying a transverse axle at one end, a hand operated lever pivotally mounted onto said axle, square shaped gripping members pivotally connected to said pivoting frame and in part extending beneath the lower portion thereof to press the end of a strip to be unwound from a roll in waiting position against said lower portion of the pivoting frame, a slidable push-rod slidably mounted into said pivoting frame and connected in one hand to said hand operated lever and in second hand to said gripping members for actuation thereof from said hand operated lever when pivoted around said transverse axle, detecting means controlling said actuating mechanism of the movable cradle for detecting the passage of the end of the unwound strip and thereupon causing said actuating mechanism to move said movable cradle thus pressing said presser rollers against said end of strip coming from the roll in waiting position and said latter strip against the end of the unwound strip and said latter strip against said driving roller.

2. In a strip feeding apparatus as set forth in claim 1, the supplemental feature of providing a spring urged table beneath said pivoting frame to bear against said strip which is being unwound and against said strip pressed by said gripping member when said movable cradle is actuated, and to provide fixedly mounted slide elements on both sides of said table to longitudinally guide said strip.

3. In a strip feeding apparatus as set forth in claim 1, the supplemental feature of providing said push-rod connected to said gripping members with an urging spring mounted so that said gripping members are automatically urged against said lower part of the pivoting frame.

References Cited in the file of this patent
UNITED STATES PATENTS

| | | |
|---|---|---|
| 2,001,113 | Schaefer | May 14, 1935 |
| 2,752,984 | Casey | July 3, 1956 |
| 2,752,985 | Aldrich | July 31, 1956 |
| 2,772,055 | Klingelfuss | Nov. 27, 1956 |